United States Patent
Balinsky et al.

(10) Patent No.: US 10,210,339 B2
(45) Date of Patent: Feb. 19, 2019

(54) CANCELLATION REQUESTS

(71) Applicant: Hewlett-Packard Development Company, L.P., Houston, TX (US)

(72) Inventors: Helen Balinsky, Cardiff (GB); Shivaun Albright, Rocklin, CA (US); Nassir Mohammad, Bristol (GB); Hector Rodriguez Aviles, Meridian, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 130 days.

(21) Appl. No.: 15/307,288

(22) PCT Filed: Sep. 30, 2014

(86) PCT No.: PCT/US2014/058177
§ 371 (c)(1),
(2) Date: Oct. 27, 2016

(87) PCT Pub. No.: WO2016/053267
PCT Pub. Date: Apr. 7, 2016

(65) Prior Publication Data
US 2017/0046525 A1    Feb. 16, 2017

(51) Int. Cl.
*G06F 21/60* (2013.01)
*G06F 3/12* (2006.01)
*G06F 9/38* (2018.01)
*G06F 21/00* (2013.01)
*G06F 21/55* (2013.01)
(Continued)

(52) U.S. Cl.
CPC .......... *G06F 21/608* (2013.01); *G06F 3/1259* (2013.01); *G06F 3/1274* (2013.01); *G06F 9/38* (2013.01); *G06F 9/4881* (2013.01); *G06F 21/00* (2013.01); *G06F 21/44* (2013.01); *G06F 21/554* (2013.01)

(58) Field of Classification Search
CPC .... G06F 3/1274; G06F 3/1259; G06F 21/608; G06F 21/30; H04L 9/32
See application file for complete search history.

(56) References Cited

U.S. PATENT DOCUMENTS 6,683,696 B1   1/2004  Urie et al.
7,003,667 B1   2/2006  Slick et al.
(Continued)

FOREIGN PATENT DOCUMENTS

| EP | 1806651 | 7/2007 |
|---|---|---|
| EP | 1959373 | 8/2008 |
| EP | 1879126 | 1/2009 |

OTHER PUBLICATIONS

Secure Print and Data Loss Prevention: Minimizing the Threats of Internal Data Leakage, Sep. 18, 2012. 1 page. https://www.hidglobal.com/sites/hidglobal.com/files/.

*Primary Examiner* — Thaddeus J Plecha
(74) *Attorney, Agent, or Firm* — HP Inc. Patent Department (57) ABSTRACT

Examples disclosed herein relate to request authorization and authentication. Examples include to intercept a request from a processing pipeline of a device. The device to determine whether the request is authorized and authentic. The device to generate a cancellation request if the request is not authorized or not authenticated. The device to provide the cancellation request to the processing pipeline of the device.

16 Claims, 3 Drawing Sheets

(51) Int. Cl.
    *G06F 9/48*    (2006.01)
    *G06F 21/44*    (2013.01)

(56)     References Cited

U.S. PATENT DOCUMENTS

| | | | |
|---|---|---|---|
| 7,319,535 | B2 | 1/2008 | Cherry et al. |
| 8,059,303 | B2 | 11/2011 | Shaw |
| 8,253,957 | B2 | 8/2012 | Kato |
| 2002/0042884 | A1 | 4/2002 | Wu et al. |
| 2003/0014640 | A1 | 1/2003 | Loyd |
| 2004/0010704 | A1* | 1/2004 | Lewis ................ G06F 21/608 726/4 |
| 2005/0283735 | A1* | 12/2005 | Ferlitsch ............ G06F 3/04817 715/771 |
| 2008/0030769 | A1* | 2/2008 | Hanaoka ............ G03G 15/5075 358/1.15 |
| 2008/0055630 | A1 | 3/2008 | Hu et al. |
| 2008/0198410 | A1 | 8/2008 | Hattori |
| 2008/0266604 | A1* | 10/2008 | Kuroki ................ G06F 3/1213 358/1.16 |
| 2009/0086252 | A1* | 4/2009 | Zucker ............... G06F 21/6281 358/1.14 |
| 2009/0158402 | A1 | 6/2009 | Ding |
| 2009/0296161 | A1* | 12/2009 | Iura .................... G06F 21/608 358/3.28 |
| 2010/0027047 | A1* | 2/2010 | Hikosaka ........... H04N 1/00244 358/1.14 |
| 2010/0225950 | A1 | 9/2010 | Yasuhara |
| 2013/0057910 | A1* | 3/2013 | Matsumoto ......... G06K 15/402 358/1.15 |
| 2014/0123244 | A1 | 5/2014 | Resch et al. |
| 2014/0192376 | A1* | 7/2014 | Morimoto ............ G06F 3/121 358/1.13 |
| 2014/0229739 | A1 | 8/2014 | Roth et al. |

* cited by examiner

CANCELLATION REQUESTS

BACKGROUND

Protection of data from unauthorized access is desired. Various methods for preventing access to electronic documents have been developed. In some examples, access to printing devices and scanning devices is limited to prevent data loss.

BRIEF DESCRIPTION OF THE DRAWINGS

The following detailed description references the drawings, wherein.

DETAILED DESCRIPTION

As used herein, a "request" (or "request") is an instruction (i.e., command) executable by a computing device to perform at least one function in the computing device. A "computing device" or "device" may be a desktop computer, laptop (or notebook) computer, workstation, tablet computer, mobile phone, smart device, server, blade enclosure, imaging device, or any other processing device or equipment. For example, a request may be instructions to analyze data, alter a setting of the computing device, provide data to a second device, store data, etc. A "job request," as used herein, is an instruction (i.e., command) executable by a computing device to perform at least one function in an imaging device. An "imaging device" may be a hardware device, such as a printer, scanner, photocopier, multifunction printer (MFP), or any other device with functionalities to physically produce, scan, or copy graphical representation(s) (e.g., text, images, models etc.) on paper, photopolymers, thermopolymers, plastics, composite, metal, wood, or the like. In some examples, an MFP may be capable of performing a combination of multiple different functionalities such as, for example, printing, photocopying, scanning, faxing, etc. For example, the function with respect to an imaging device may be to reboot the imaging device, troubleshoot the imaging device, upgrade firmware, retrieve consumable level information, clone features, adjust security settings, perform a test, perform device discovery, alter trap events, retrieve a scan, execute a print request, execute a photocopy request, clear an alert, etc.

As used herein, "authentication" or to "authenticate" refers to a determination of the origin and integrity of a request. For example, a request may be authenticated by verifying a digital signature in the request. A "digital signature" may be a scheme for demonstrating the authenticity of a request. A valid digital signature may indicate that the request was created by a known sender and that the message was not altered in transit. As used herein, "authorization" and to "authorize" refers to a determination that a request was provided by an authorized sender. For example, a request was sent from a device authorized to interact with the computing device. A request may be determined to be authorized by validating a digital signature of the request was provided by an authorized device. An "authorized device" may be any device authorized to perform actions according to a data handling policy.

Preventing data loss resulting from accidental or intentional actions that breach data handling policies is a goal of any networked environment. Data handling protocols to provide access to authorized persons and devices have been developed. However, data handling protocols may not be able to prevent loss of data through imaging devices. For example, some imaging devices may not be able to determine whether a job request meets a data handling policy due to limited processing resources. In other examples, the time constraints of determining whether a job request meets a data handling policy in an imaging device may reduce printing speeds to unacceptable levels. In such examples, a second device (e.g., an authorization device) in the networked environment may be used to determine whether a job request meets a data handling policy prior to outputting the job request from the imaging device. The authorization device may provide only authorized and authentic job requests to the imaging device and the imaging device may be instructed to only accept requests from the authorization device. However, the authenticated and authorized job request may be intercepted en route to the imaging device and altered before being received by the imaging device. In another example, an imaging device may receive a job request which has not been approved by the authorization device or intermediary devices (e.g., spool servers) in the networked environment.

To address these issues, in the examples described herein, a device may determine whether a request is authentic and authorized. For example, an authorization device may provide a digital signature to a request to express the request meets a data handling policy. In such examples, the device (e.g., imaging device) may remove or intercept the request from a processing pipeline of the device to perform the determination. If the request is determined to be authentic and authorized it may be provided to the processing pipeline of the device for processing. If the request is determined to not be authorized or not authentic, the device may generate a cancellation request and provide the cancellation request to the processing pipeline of the device. In another example, the device may directly provide the cancellation request to a status block of the device. In such an example the cancellation request may be logged in the imaging device. In such examples, the device may further provide the request to another device when the cancellation request is generated. In such an example, the second device may analyze the rejected request, for example to identify any violation of the data handling policy. In this manner, examples described herein may significantly reduce the processing resources utilized in processing non-authorized and/or non-authentic jobs in devices.

Figure 1:
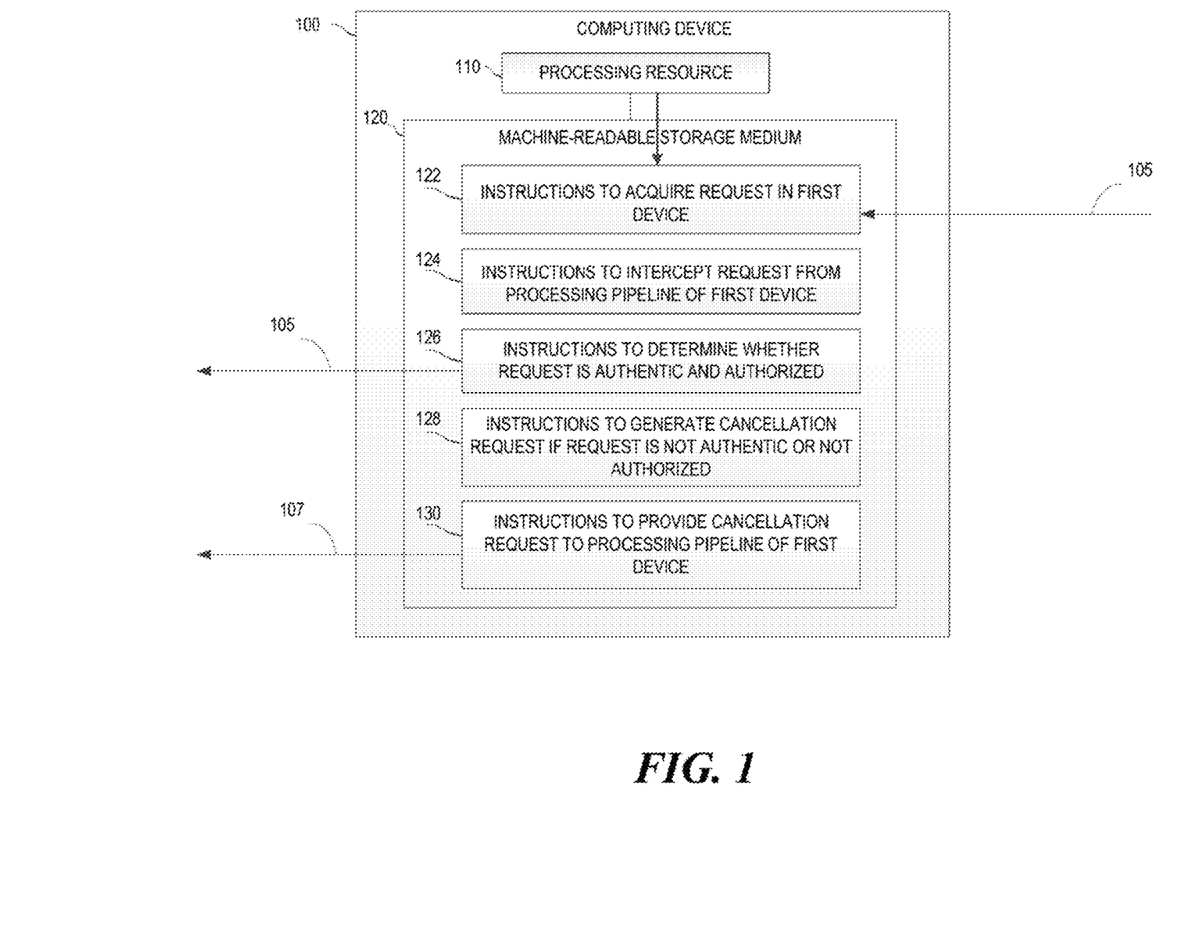
FIG. 1 is a block diagram of an example computing device to generate a cancellation request in a device.

Referring now to the drawings, FIG. 1 is a block diagram of an example computing device 100 to provide a cancellation request in a device. In the example of FIG. 1 computing device 100 includes a processing resource 110 and a machine readable storage medium 120 comprising (e.g., encoded with) instructions 122, 124, 126, 128, and 130 executable by processing resource 110. In some examples, storage medium 120 may include additional instructions. In some examples, instructions 122, 124, 126, 128, and 130, and any other instructions described herein in relation to storage medium 120, may be stored on a machine-readable storage medium remote from but accessible to computing device 100 and processing resource 110 (e.g., via a computer network). In some examples, instructions 122, 124, 126, 128, and 130 may be instructions of a computer program, computer application (app), agent, or the like, of computing device 100. In other examples, the functionalities described herein in relation to instructions 122, 124, 126, 128, and 130 may be implemented as engines comprising any combination of hardware and programming to implement the functionalities of the engines, as described below.

In examples described herein, a processing resource may include, for example, one processor OF multiple processors included in a single computing device (as shown in FIG. 1) or distributed across multiple computing devices. A "processor" may be at least one of a central processing unit (CPU), a semiconductor-based microprocessor, a graphics processing unit (CPU), a field-programmable gate array (FPGA) to retrieve and execute instructions, other electronic circuitry suitable for the retrieval and execution of instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g. a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may actively acquire (e.g., retrieve, etc.) or passively acquire (e.g., receive, etc.) a request 105 in computing device 100. In some examples, the request 105 may be a job request of an imaging device. In an examples, the computing device 100 may be any device to acquire, process, and execute the request.

In instructions 124, the computing device 100 may intercept request 105 from a processing pipeline of computing device 100. As used herein, a "processing pipeline" refers to any firmware, hardware, software, or any combination thereof to process and execute the request 105 or any other request normally received in the computing device 100. In some examples, computing device 100 may intercept request 105 by capturing it before it enters the processing pipeline of computing device 100. In other examples, computing device 100 may remove request 105 from a processing pipeline and computing device 100 may return to the processing pipeline at instructions 130. In some examples, the intercepted request 105 may be transferred to a second device and/or storage location of computing device 100 which is not part of the processing pipeline. For examples, the request 105 may be stored in a temporary location in machine readable storage medium 120 of computing device 100.

In instructions 126, computing device 100 may determine whether request 105 is authentic and authorized. If request 105 is determined to be authentic and authorized, request 105 may be provided to the processing pipeline of computing device 100. In an example, computing device 100 may determine request 105 is authentic and authorized in a processing pipeline. In other examples, computing device 100 may determine request 105 is authentic and authorized outside the processing pipeline. In some examples, computing device 100 may determine whether request 105 is authentic and authorized by verifying a digital signature of request 105.

In some examples, the digital signature may be applied to the request 105 by a device or authorization device. As used herein, an "authorization device" may be a device to determine whether a request may be fulfilled by computing device 100 and may be a dedicated device, machine readable instructions on a device, or a service operating over multiple devices (e.g., a web-service, cloud service, a local service, a server, etc.). For example, the authorization device may evaluate the contents of request 105, meta-data (e.g., owner, date, time, etc.), etc, according to the data handling policy. In some implementations, the data handling policy may consist of a group of individual policies which limit which materials are allowed for processing, for example by a group of individuals/roles, job meta-data, and/or contents, specific imaging devices and their capabilities, location, restricted access and or security (e.g., a document may be permitted to print out when the a specific person is in the vicinity of the imaging device), date/time (e.g., a document type may be permitted to be printed during office hours only), etc. When request 105 is determined to meet the data handling policy, the authorization device may provide the digital signature to request 105. In other examples, the digital signature may be applied to job request 105 by an originating device of request 105. In such examples, the originating device of request 105 may receive the digital signature or instructions to apply the digital signature to the request 105 from the authorization device. For examples, the request 105 may be a job request from a laptop computer with a digital signature provided by an authorization device (e.g., an authorization service). In such an example, the authorization server may apply the digital signature to the job request or may instruct the laptop computer to apply the digital signature to the job request.

In an example, the job request may be a photocopy request from an imaging device. In such an example, the imaging device may scan the photocopy request and store it in the imaging device without producing a physical copy of the document. The imaging device may provide the scanned photocopy request to an authorization server to determine if the job request meets a data handling policy. For example, the authorization server may determine the photocopy meets the data handling policy if the imaging device is an authorized device and the individual requesting the photocopy request is an authorized user. In another example, the authorization server may determine the photocopy request meets the data handling policy if the contents of the photocopy request are permitted to be photocopied In some examples, the authorization server may extract text and images from the photocopy request, perform an optical character recognition (OCR), search for keywords, classify text and/or images, and determine whether the photocopy request meets the data handling policy. If the authorization server determines the photocopy request meets the data handling policy, the authorization server may instruct the imaging device to produce a physical copy of the document by providing the digital signature. In another example, the job request may be a scan request from an imaging device. In such examples, the authorization server may determine the scan request meets the data handling policy as described above and may instruct the imaging device to transmit the scanned image of the document to a destination if the document meets the data handling policy.

In another example, the job request may be a print request from an originating device to an imaging device. In such an example, an authorization server may receive the print request from the originating device and determine whether the print request meets a data handling policy as described above. In some examples the authorization server may provide a digital signature to the print request and forward the print request to the imaging device. In other examples, when the print request is determined to meet the data handling policy, the authorization server may produce an authorization signature and instruct the originating device to add a digital signature to the print request. The imaging device may then receive a print request with a digital signature for processing. In such an example, computing device 100 may intercept the print job request as discussed above with respect to instruction 124. Computing device 100 may determine the print request is authentic and authorized by digital signature verification. In such an example, computing device 100 may provide the print request to the processing pipeline of the imaging device if the digital signature is determined to be valid (and produced by the authorization device) and the imaging device may produce the document.

In instructions 128, computing device 100 may generate a cancellation request 107 in response to a determination that request 105 is not authentic or not authorized. For example, the computing device 100 may determine request 105 is not authentic or not authorized when a digital signature is missing, corrupt, determined to not be valid, etc. As used herein, "cancellation request" may be a request to indicate that request 105 has been cancelled or will not be processed and may include identification information of request 105. In an example, cancellation request 107 may include instructions (i.e., commands) to cancel or terminate processing of request 105. In some examples, cancellation request 107 may include a cancellation reason to identify why request 105 was not authorized or not authentic. In such examples, the cancellation request may include at least one of instructions to display the cancellation reason on the device, log the cancellation reason in the device, print the cancellation reason, and provide the cancellation reason to a second device. For example, cancellation request 107 may include a cancellation reason and instructions to display the cancellation reason on a device. In another example, cancellation request 107 may be logged in a log of the device or a status area of the device. In some examples, cancellation request 107 may include a wrapper of the request. For example, if request 105 is a job request which includes a wrapper in a Print Job Language ("PJL"), cancellation request 107 of the job request may include the PJL wrapper, cancellation reason, and at least one of instructions to display the cancellation reason on the device, log the cancellation reason in the device, print the cancellation reason, and provide the cancellation reason to a second device. In such examples, identification information about the job request may be extracted from the wrapper of the job request and provided as part of the cancellation reason. In another example, a cancellation request may contain the job request such that subsequent security analysis may be performed on the cancellation request by a second device.

In instruction 130, computing device 100 may provide cancellation request 107 to the processing pipeline of computing device 100. In an example, the processing pipeline of computing device 100 may process cancellation request 107 according to the instructions provided therein. In an example, cancellation request 107 may be generated in an imaging device in response to a determination that a job request is not authentic or not authorized. In such an example, cancellation request 107 may be provided to the processing pipeline of the imaging device before the job request entered the processing pipeline because the job request was intercepted from entering the processing pipeline, as described above with respect to instructions 124. In another example, cancellation request 107 may be provided to a status component of computing device 100 without entering the processing pipeline according to cancellation request 107. For examples, when cancellation request 107 includes identification information of request 105 and instructions to display a cancellation reason, computing device 100 may provide cancellation request 107 to a display of computing device 100 without entering the processing pipeline of computing device 100.

In some examples, instructions 122, 124, 126, 128, and 130 may be part of an installation package that, when installed, may be executed by processing resource 110 to implement the functionalities described herein in relation to instructions 122, 124, 126, 128, and 130. In such examples, storage medium 120 may be a portable medium, such as a CD, DVD, flash drive, or a memory maintained by a computing device from which the installation package can be downloaded and installed. In other examples, instructions 122, 124, 126, 128, and 130 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-3.

Figure 2:
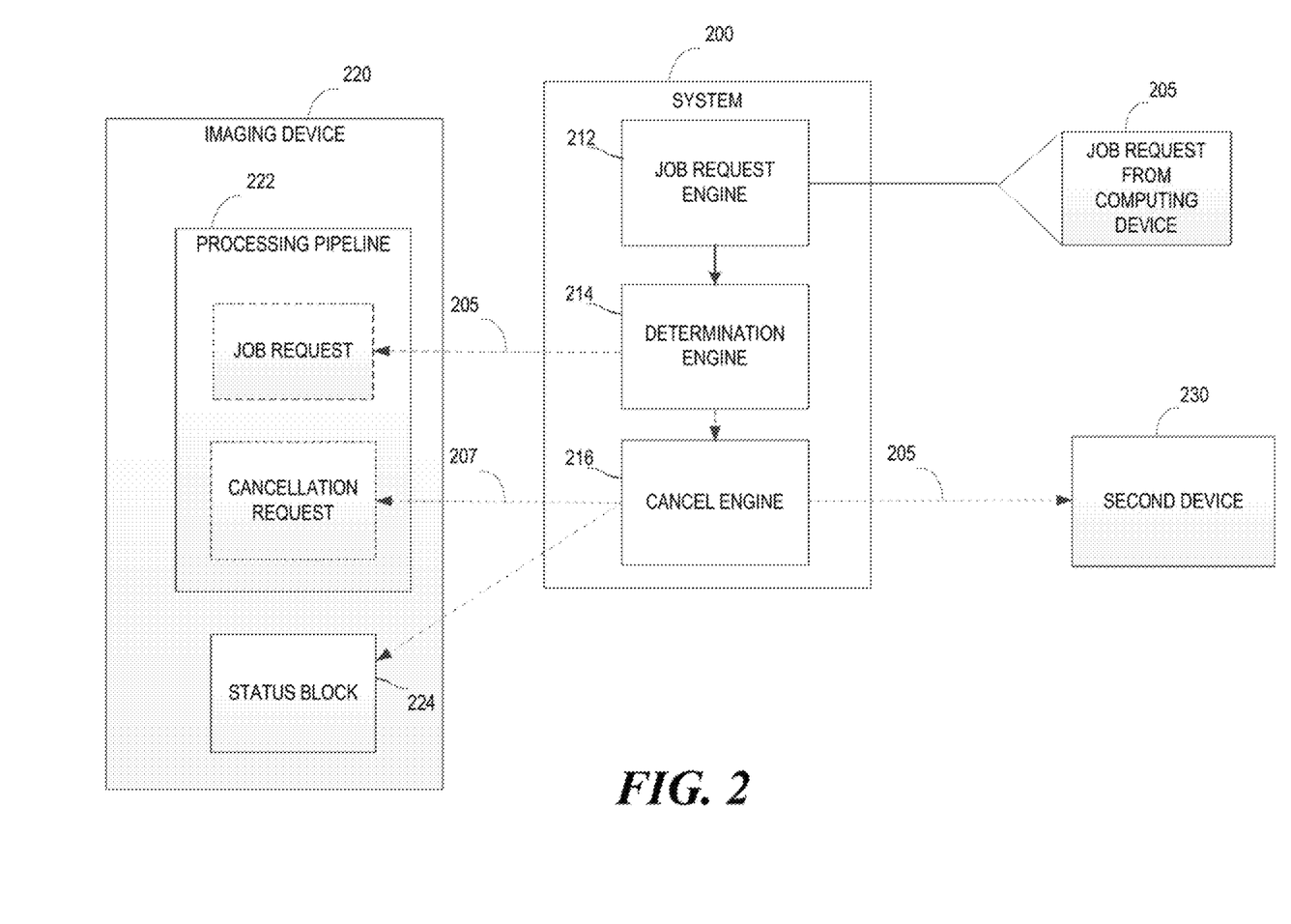
FIG. 2 is a block diagram of an example system to provide a cancellation request to an imaging device.

FIG. 2 is a block diagram of an example system 200 to provide cancellation request 207 to an imaging device 220. In the example of FIG. 2, system 200 includes at least engines 212, 214, and 216, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 212, 214, and 216. In such examples, system 200 may include the machine-readable storage medium storing the instructions and the processing resource to execute the instructions, or the machine-readable storage medium may be separate but accessible to system 200 and the processing resource.

In some examples, the instructions can be part of an installation package that, when installed, can be executed by the processing resource to implement at least engines 212, 214, and 216. In such examples, the machine-readable storage medium may be a portable medium, such as a CD. DVD, or flash drive, or a memory maintained by a computing device from which the installation package can be downloaded and installed. In other examples, the instructions may be part of an application, applications, or component already installed on system 200 including the processing resource. In such examples, the machine-readable storage medium may include memory such as a hard drive, solid state drive, or the like. In other examples, the functionalities of any engines of system 200 may be implemented in the form of electronic circuitry.

In the example of FIG. 2, job request engine 212 may acquire job request 205 in a computing device. Job request engine 212 may include instructions to intercept job request 205 from a processing pipeline 222 of imaging device 220 as described above with respect to FIG. 1. In some examples, job request engine 212 may be an input output (I/O) filter or more than one I/O filters of an imaging device. In an example, the I/O filter of job request engine 212 may be placed in a first position of a filter pipeline of the imaging device to ensure the job request 205 is intercepted from the processing pipeline 222. In other examples, the I/O filter of job request engine 212 may be placed in any other position in the filter pipeline of the imaging device, thus for example, allowing some job requests to be processed without authorization. In such an example, any job request processed by the prior filters may be exempted from entering job request engine 212. System 200 and imaging device 220 may be separate devices or integrated together as part of one device. In an example, the computing device may be an imaging device. In another example, the computing device may be a desktop computer or laptop computer.

In some examples, determination engine 214 may determine whether job request 205 is authentic and authorized. For example, determination engine 214 may determine whether job request 205 is authentic and authorized according to a digital signature of job request 205 as described above with respect to FIG. 1. If job request 205 is determined to be authentic and authorized, determination engine 214 may provide job request 205 to processing pipeline 222 of imaging device 220.

Cancel engine 216 may generate a cancellation request 207 if determination engine 214 determines job request 205 is not authorized or not authentic. The cancellation request 207 may be any cancellation request as described above with respect to FIG. 1. In an example, cancel engine 216 may provide cancellation request 207 to processing pipeline 222 of imaging device 220. In an example, processing pipeline 222 may process cancellation request 207 and provide a cancellation reason to status module 224 according to instructions in cancellation request 207. Status module 224 may be a display of imaging device 220 to display the cancellation reason. In such an example, cancellation request 207 may also be logged or stored in the imaging device. In another example, cancel engine 216 may provide job request 205 to second device 230 according to instructions in cancellation request 207. In some examples, second device 230 may be a device to analyze job request 205 for violations of the data handling policy and may alert a security manager of the violation of the data handling policy. In yet another example, cancel engine 216 may provide cancellation request 207 directly to the status module of the device according to cancellation request 207. In such an example, cancellation request 207 may include instructions to display a cancellation reason on status block 224.

Figure 3:
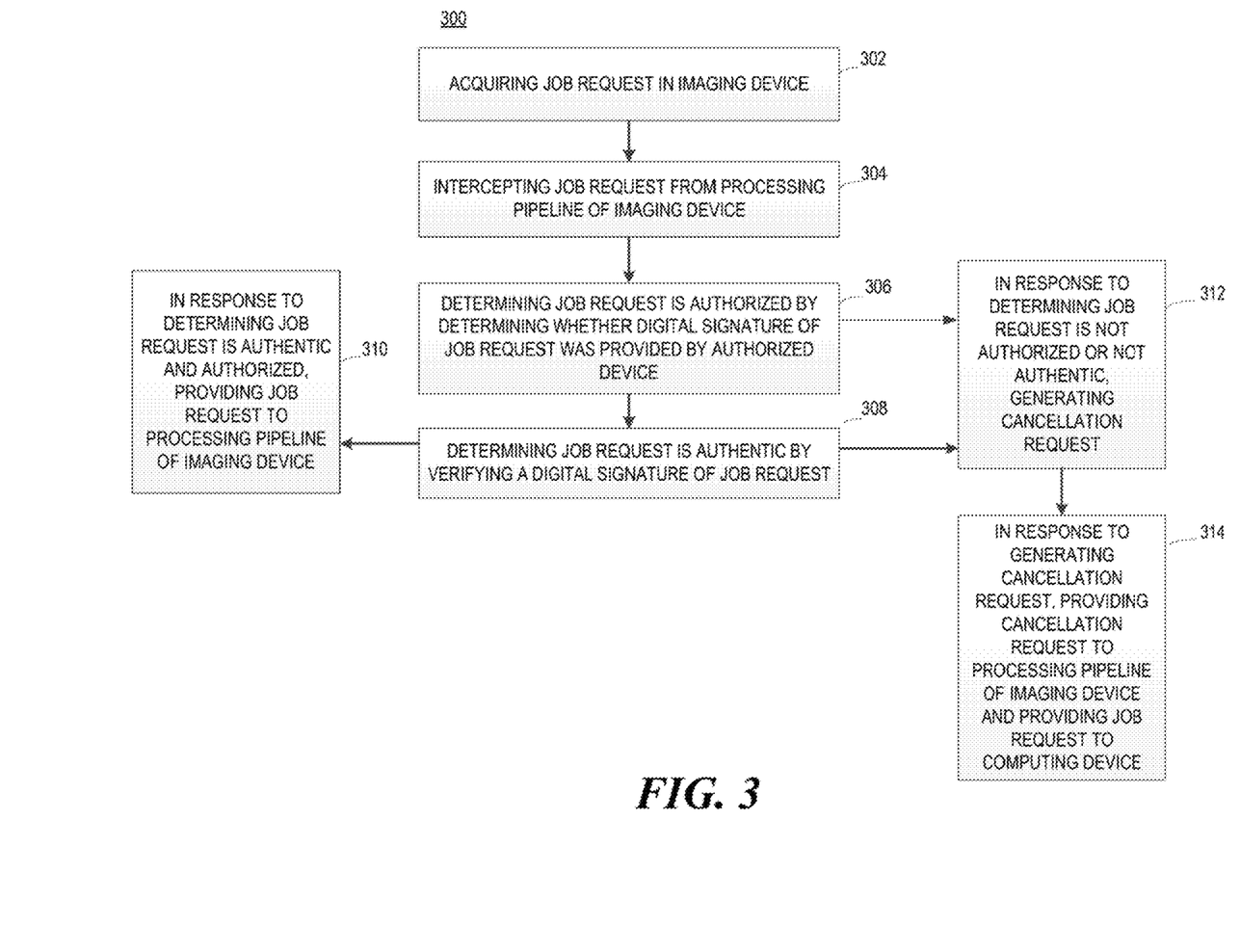
FIG. 3 is a flowchart of an example method for providing a cancellation request.

FIG. 3 is a flowchart of an example method 300 for providing a cancellation request. Although execution of method 300 is described below with reference to system 200 described above, other suitable systems (computing device 100) for the execution of method 300 can be utilized. Additionally, implementation of method 300 is not limited to such examples.

At 302 of method 300, system 200 may acquire a job request 205. Job request 205 may be any job request described above with respect to FIG. 1 and FIG. 2. In the example of FIG. 3, the job request may be a print request.

At 304, system 200 may intercept job request 205 from the processing pipeline 222 of imaging device 220 as described above with respect to FIG. 1 and FIG. 2.

At 306, determination engine 214 of system 200 may determine whether job request 205 is authorized by determining whether a digital signature of job request 205 was provided by an authorized device. In the example of FIG. 3, the authorized device may be an authorization server. As described above, the digital signature of job request 205 may be provided by the authorization device when job request 205 is determined to meet a data handling policy.

At 308, determination engine 214 of system 200 may determine whether job request 205 is authentic by verifying the digital signature of job request 205. In some examples, the digital signature of the job request 205 may be verified according to a signature verifying algorithm, such as a RSA-PSS algorithm, a Digital Signature Algorithm (DSA), an Elliptic Curve Digital Signature Algorithm (ECDSA), an ElGamal signature algorithm, a Schnorr signature algorithm, a Pointcheval-Stern signature algorithm, a Rabin signature algorithm, etc. In other examples, a trusted public certificate of an authorization device may be used by the determination engine 214 to determine whether job request 205 is authentic.

At 310, in response to determining job request 205 is authentic and authorized, determination engine 214 may provide job request 205 to processing pipeline 222 of imaging device 220.

At 312, in response to determining job request 205 is not authorized or not authentic, cancel engine 215 may generate a cancellation request 207.

At 314, in response to generating cancellation request 207, cancel engine 216 may provide cancellation request 207 to processing pipeline 222 of imaging device 220 and provide job request 205 to a computing device.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2.

What is claimed is:
1. A system, comprising:
   a processor; and
   a non-transitory machine-readable storage medium storing instruction that the processor is to execute to implement:
      a job request engine to receive a job request from a first computing device and intercept the job request from a processing pipeline of an imaging device;
      a determination engine to determine whether the job request is authorized and authentic and provide the job request to the processing pipeline of the imaging device when the job request is determined to be authorized and authentic; and
      a cancel engine to generate a cancellation request when the job request is not authorized or not authenticated, to provide the cancellation request to the processing pipeline of the imaging device based on a content of the cancellation request, and to provide the job request to a second computing device in response to generation of the cancellation request.
2. The system of claim 1, wherein the determination engine determines that the job request is authentic in response to verification of a digital signature of the job request and determines that the job request is authorized when the digital signature of the request is determined to be provided by an authorized device.

3. The system of claim 1, wherein the cancellation request includes the job request and at least one of a command to display a cancellation reason on a display or the imaging device, print the cancellation reason, or provide the cancellation reason to a second computing device.

4. The system of claim 3, wherein the cancel engine is to provide the cancellation request directly to a status block of the imaging device when the cancellation request includes the command to display the cancellation reason on the status block.

5. The system of claim 1, wherein the cancellation request includes a command to instruct the imaging device to cancel the job request.

6. The system of claim 1, wherein the cancellation request includes identification information of the job request and information to indicate the job request was cancelled.

7. The system of claim 1, wherein the job request engine removes the job request from the processing pipeline of the imaging device by capturing the job request prior to the job request entering the processing pipeline of the imaging device.

8. A method, comprising:
acquiring a job request in an imaging device;
intercepting the job request from a processing pipeline of the imaging device;
determining the job request is authorized by determining whether a digital signature of the job request was provided by an authorized device;
determining the job request is authentic by verifying a digital signature of the job request;
in response to determining the job request is authentic and authorized, providing the job request to the processing pipeline of the imaging device;
in response to determining the job request is not authorized or not authentic, generating a cancellation request; and
in response to generating the cancellation request, providing the cancellation request to the processing pipeline of the imaging device and providing the job request to a computing device,
wherein the cancellation request includes identification information of the job request and information to indicate the job request was cancelled.

9. The method of claim 8, wherein the cancellation request includes a wrapper of the job request and at least one of a command to instruct the imaging device to cancel the job request, display a cancellation reason on a display of the imaging device, print the cancellation reason, or provide the cancellation reason to the computing device.

10. A non-transitory machine-readable storage medium comprising instructions executable by a processing resource to:
receive a job request from a first computing device and intercept the job request from a processing pipeline of an imaging device;
determine whether the job request is authorized and authentic and provide the job request to the processing pipeline of the imaging device when the job request is determined to be authorized and authentic; and
generate a cancellation request when the job request is not authorized or not authenticated, to provide the cancellation request to the processing pipeline of the imaging device based on a content of the cancellation request, and to provide the job request to a second computing device in response to generation of the cancellation request.

11. The non-transitory machine-readable storage medium of claim 10, wherein the processing resource determines that the job request is authentic in response to verification of a digital signature of the job request and determines that the job request is authorized when the digital signature of the request is determined to be provided by an authorized device.

12. The non-transitory machine-readable storage medium of claim 10, wherein the cancellation request includes the job request and at least one of a command to display a cancellation reason on a display of the imaging device, print the cancellation reason, or provide the cancellation reason to a second computing device.

13. The non-transitory machine-readable storage medium of claim 12, wherein the processing resource is to provide the cancellation request directly to a status block of the imaging device when the cancellation request includes the command to display the cancellation reason on the status block.

14. The non-transitory machine-readable storage medium of claim 10, wherein the cancellation request includes a command to instruct the imaging device to cancel the job request.

15. The non-transitory machine-readable storage medium of claim 10, wherein the cancellation request includes identification information of the job request and information to indicate the job request was cancelled.

16. The non-transitory machine-readable storage medium of claim 10, wherein the processing resource removes the job request from the processing pipeline of the imaging device by capturing the job request prior to the job request entering the processing pipeline of the imaging device.

* * * * *

UNITED STATES PATENT AND TRADEMARK OFFICE
CERTIFICATE OF CORRECTION

PATENT NO. : 10,210,339 B2  
APPLICATION NO. : 15/307288  
DATED : February 19, 2019  
INVENTOR(S) : Helen Balinsky et al.

Page 1 of 1

It is certified that error appears in the above-identified patent and that said Letters Patent is hereby corrected as shown below:

In the Claims

In Column 9, Line 5, in Claim 3, delete "or" and insert -- of --, therefor.

Signed and Sealed this
Nineteenth Day of November, 2019

Andrei Iancu
*Director of the United States Patent and Trademark Office*